United States Patent [19]
Gwilliam

[11] 3,724,663
[45] Apr. 3, 1973

[54] TUBE PRESSURE FILTERS

[75] Inventor: Ralph Derek Gwilliam, Cornwall, England

[73] Assignee: English Clays Lovering Pochin & Company Limited, St. Austell, Cornwall, England

[22] Filed: Feb. 2, 1971

[21] Appl. No.: 111,970

[30] Foreign Application Priority Data

Feb. 11, 1970 Great Britain.......................6,698/70

[52] U.S. Cl. ...................210/85, 210/106, 210/142, 210/143, 210/332, 210/340, 210/350
[51] Int. Cl. .............................................B01d 29/36
[58] Field of Search............210/102, 103, 106, 108, 210/141-143, 332, 333, 334, 85, 86, 94, 340, 341, 350

[56] References Cited

UNITED STATES PATENTS

| | | | |
|---|---|---|---|
| 3,278,031 | 10/1966 | Rosaen | 210/106 |
| 3,117,233 | 1/1964 | Mittelberger | 210/94 X |
| 3,012,156 | 12/1961 | Simmons | 210/142 X |
| 2,475,968 | 7/1949 | Jokel | 210/106 |

*Primary Examiner*—John Adee
*Attorney*—Larson, Taylor & Hinds

[57] ABSTRACT

Apparatus for reducing the liquid content of wet, particulate, solid material comprises at least one tube pressure filter having relatively movable, co-axial tubular bodies in association with an arrangement comprising a radiation source for directing a beam of radiation across the intended path of discharging filter cake, a receiver for the beam downstream of said path and sensing means coupled to the receiver for sensing interception of said beam by a filter cake and coupled to sense relative displacement of said tubular bodies, to determine whether filter cake has been discharged from said filter in an operation cycle of said filter.

7 Claims, 4 Drawing Figures

TUBE PRESSURE FILTERS

BACKGROUND OF THE INVENTION

This invention relates to apparatus for reducing the liquid content of wet, particulate solid materials.

It has been well known for many years to reduce the liquid content of wet, particulate solid materials, for example in the form of a slurry, by means of plate filter presses. When treating solid materials, such as clays and chalks, which contain a relatively high percentage, say more than 20 percent, of particles smaller than 20 microns, it is necessary to employ high pressures to produce a filter cake of low moisture content. However, serious engineering problems arise with conventional plate filter presses when it is desired to operate at very high pressures, for example in excess of 1,000 p.s.i. Consequently, in recent years there have been developed what are known as tube pressure filters which are capable of operating at such high pressures. Various kinds of tube pressure filters have been described; see, for example, U.K. Patent No. 907,485 and my U.S. application, Ser. No. 871,467.

One kind of tube pressure filter essentially comprises a pair of generally coaxial tubular bodies forming between them an annular chamber; an impermeable elastic sleeve which is secured to the outer of the pair of tubular bodies and divides said chamber into generally coaxial and non-communicating inner and outer compartments, the inner compartment including an inlet, for a wet particulate solid material to be pressure filtered, and a filter element which is supported by the inner of the pair of tubular bodies, the inner tubular body and the filter element being constructed and arranged so as to permit liquid to flow through the filter element and the inner tubular body while preventing the flow therethrough of the particulate solid material, and the outer compartment including an inlet for a hydraulic fluid under pressure whereby the impermeable elastic sleeve can be urged against a wet particulate solid material in the inner compartment to compress the same and remove liquid therefrom; and means for displacing the tubular bodies axially relative to one another to a position whereat the particulate solid material can be discharged from the inner compartment. Hereinafter such a tube pressure filter will be referred to as "a tube pressure filter of the kind set forth." An operating order of this kind of tube pressure filter essentially comprises the steps of (i) introducing the slurry of finely divided solid material under pressure into the inner compartment of the tube pressure filter whilst introducing into the outer compartment of said tube pressure filter a hydraulic fluid, the slurry of finely divided solid material being introduced into said inner compartment in a manner such that said slurry is charged to the bottom of said inner compartment substantially uniformly around the inner tubular body and scours that part of the filter element supported by the lower portion of the inner tubular body, (ii) raising the pressure of said hydraulic fluid, preferably in two stages, to a pressure of at least 500 psig and maintaining said hydraulic fluid at or above said pressure for a time sufficient to effect a reduction in the liquid content of the slurry of finely divided solid material, (iii) withdrawing from said outer compartment the hydraulic fluid, (iv) displacing the tubular bodies of the tube pressure filter axially relative to one another, and (v) removing the particulate solid material from the surface of the filter element. After the particulate solid material has been removed from the surface of the filter element the tubular bodies will normally then be displaced relative to one another to their original position, thus completing a pressing cycle. If, for any reason, the filter cake is not discharged during a pressing cycle and if it still fails to discharge on the subsequent pressing cycle, the inner compartment formed between the inner tubular body and the impermeable elastic sleeve will become choked with the set, particulate solid material. It has been found to be desirable, and it is an object of this invention, to provide means which indicate whether in any particular pressing cycle, the filter cake has not been discharged. During some pressing cycles it may occur that the filter cake is only partially discharged. It this happens one of two situations will arise on the next pressing cycle: either all the filter cake from the two cycles will be discharged or there will be no discharge of the filter cake. Hence it is necessary only to establish whether or not a particular tube pressure filter has discharged and not whether the discharge has been complete.

SUMMARY OF THE INVENTION

According to the present invention there is provided, in association with at least one tube pressure filter of the kind set forth, apparatus for determining whether filter cake has been discharged from said tube pressure filter, which apparatus comprises: a source of a beam of electromagnetic radiation disposed so as to direct said beam of electromagnetic radiation across the intended path of said filter cake when the latter is discharged from said tube pressure filter; a receiver device sensitive to said electromagnetic radiation disposed in the intended path of said beam of electromagnetic radiation downstream of said intended path of said filter cake; and means for sensing the occurrence, in an operating cycle of said filter, of both (a) the interception of said beam of electromagnetic radiation by discharging filter cake and (b) the relative displacement of said tubular bodies of said tube pressure filter to their position whereat particulate solid material can be discharged, whereby it can be determined whether filter cake has been discharged from said tube pressure filter.

The present invention is of particular value in controlling the operation of a plurality of tube pressure filters which are disposed in a line so that discharge of filter cake from any one of them intercepts the beam of electromagnetic radiation, which is preferably suitably collimated and which when not interrupted by discharging filter cake impinges upon a receiver device sensitive to the electromagnetic radiation disposed on the radiation path downstream of the line of tube pressure filters. The receiver device is preferably connected to a control unit which determines the pressing cycle of each individual tube pressure filter in the line. The duration of each step in the pressing cycle of each tube pressure filter is predetermined, including the step of expressing filtrate through the filter medium. The volume of wet, finely divided solid material introduced into the second compartment of the tube pressure filter in each pressing cycle is controlled so that the expression of water is complete or substantially complete in the predetermined pressing time. As each tube pressure filter reaches that step in the pressing cycle at which the filter cake is discharged a signal is expected from the receiver device indicating that the collimated beam of electromagnetic radiation has been intercepted by the discharge of filter cake. If no such signal is received a visual or audible warning is given and appropriate action is taken to prevent the introduction of further wet, finely divided solid material into that tube pressure filter.

The electromagnetic radiation can take the form of a beam of light, but other forms of electromagnetic radiation, e.g. gamma-rays, can be used.

For practical purposes, when using a beam of light, the maximum effective range of a collimated light beam is about 30–40 feet and therefore up to 30 tube pressure filters in a single straight line can be monitored by one beam of light. However, it is convenient to restrict the number of tube pressure filters monitored by a single light beam to about 10–15.

As the receiver device may give a false signal if the beam of electromagnetic radiation is intercepted by, for example, a jet of water or a cloud of dust smoke or condensed steam, it is desirable to keep the air through which the beam passes clean.

DESCRIPTION OF THE PREFERRED EMBODIMENTS

For a better understanding of the invention and to show how the same may be carried into effect, reference will now be made, by way of example, to the accompanying drawings, in which.

Figure 1:
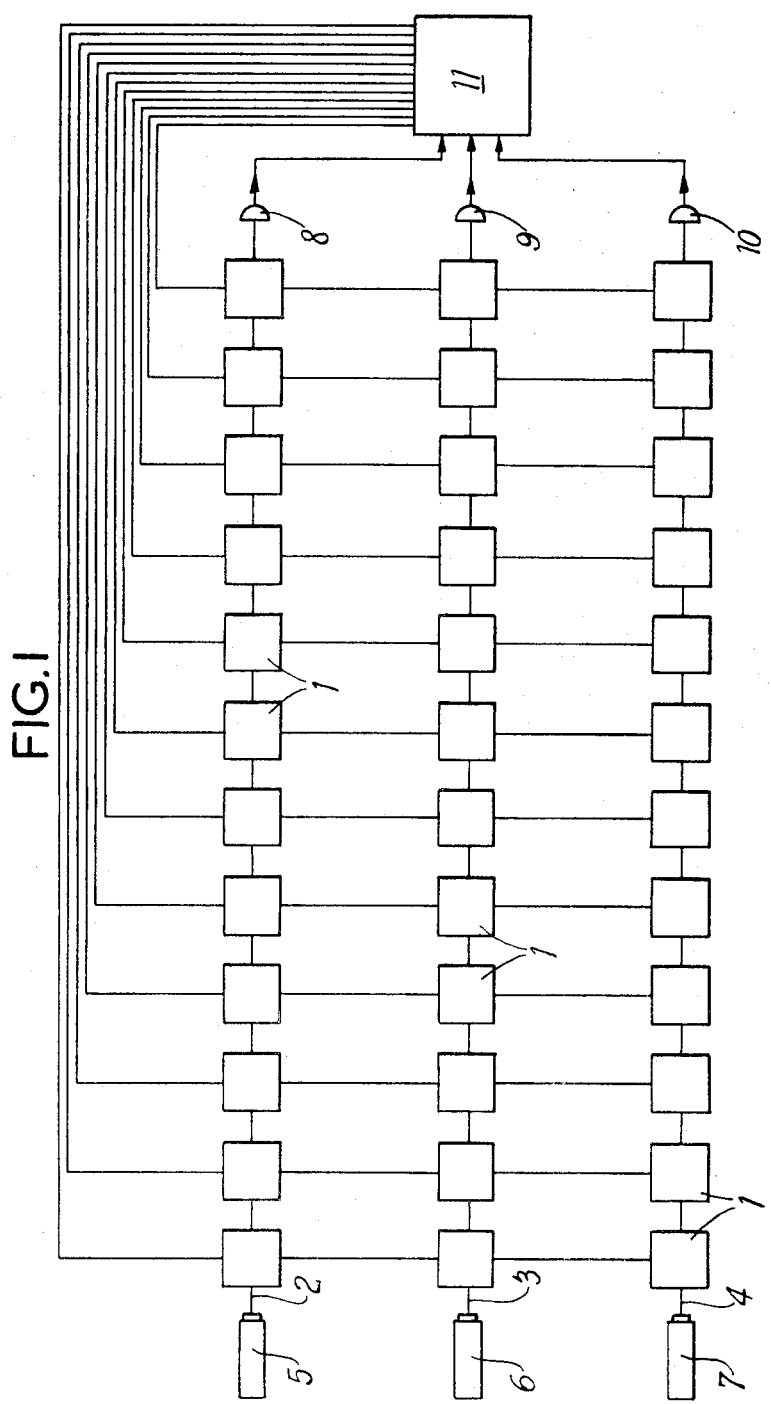
FIG. 1 shows a battery of 36 tube pressure filters.

Referring now to FIG. 1, 36 tube pressure filters 1 are linked together for control purposes in groups of three, the three tube pressure filters in each group operating in unison. Collimated light beams 2, 3 and 4 from suitable sources 5, 6 and 7 pass under the three lines of tube pressure filters so that the beams are intercepted each time a group of three pressure filters discharges filter cake. The beams impinge on three photoelectric cells 8, 9 and 10. Every time a beam of light is intercepted a signal is sent from the photoelectric cell to a control unit 11 which determines the sequence of operations for each group of three tube pressure filters. If any pressure filter fails to discharge, no signal is received to indicate that the beam of light has been intercepted and an audible warning is sounded and a lamp illuminated on the control panel of the installation. The operator can then take the necessary action to stop the supply of feed slurry to the faulty pressure filter, or alternatively, this action can be taken automatically.

Figure 2:
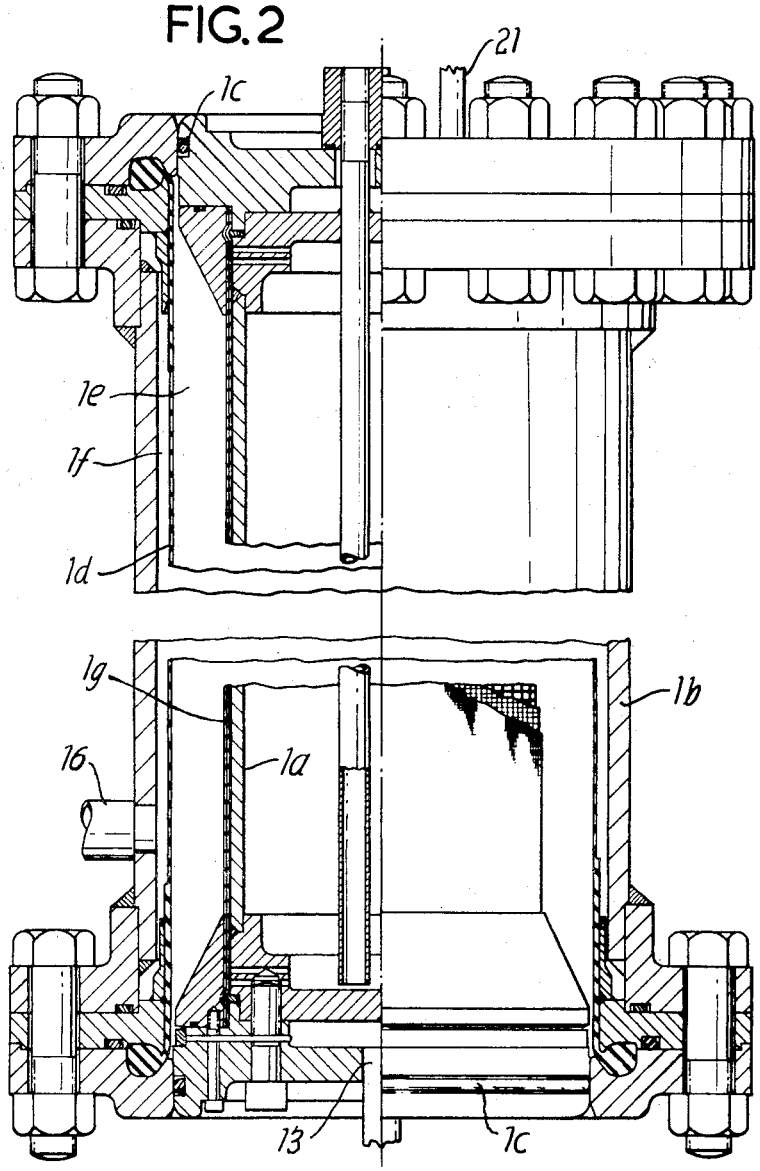
FIG. 2 is a partial cross-section of one of the pressure filters.
Figure 3:
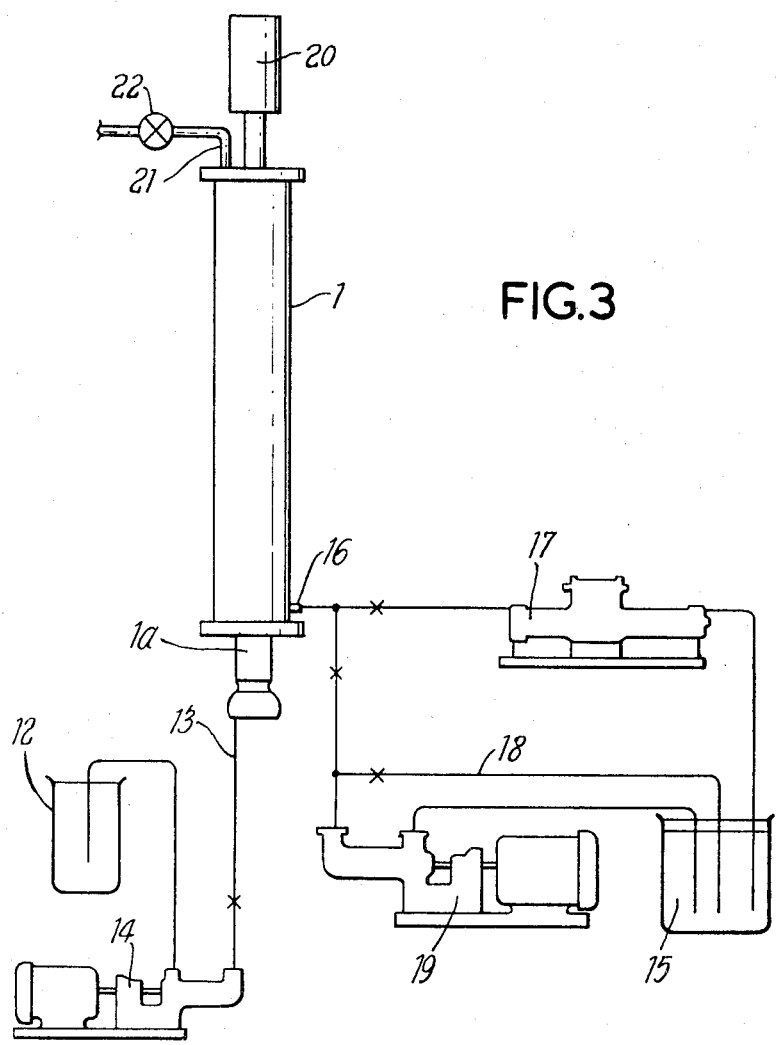
FIG. 3 is a diagrammatic representation of the filter of FIG. 2 with ancillary equipment.

FIG. 2 is a partial cross-section and FIG. 3 is a diagrammatic representation of the tube pressure filter 1, a plurality of which are used in the embodiment of FIG. 1. As shown in FIG. 2, the filter 1 comprises an inner tubular member 1a, an outer tubular member 1b, sealing means 1c at each end of the inner tubular member 1a, an impermeable elastic sleeve 1d secured to the outer tubular member 1a to define with the tubular members inner and outer non-communicating compartments 1e and 1f, an inlet 13 to the inner compartment 1e for slurry to be pressure filtered, a filter element 1g supported by the inner tubular member 1a, an inlet 16 to the outer compartment 1f for hydraulic fluid under pressure, and an inlet 21 for compressed air. FIG. 3 shows the filter 1 in conjunction with its ancillary equipment. A tank 12 contains a slurry of finely divided solid material to be treated, the tank being connected to the inlet 13 of the filter 1 by a pump 14. A tank 15 of hydraulic fluid is connected to an inlet 16 of the filter 1 by a pump 17 and return paths are provided by a conduit 18 and a reversible low-pressure vacuum pump 19. The inner tubular member 1a of the filter is coupled to a fluid-pressure operated double-acting jack 20 operable to lower the inner tubular member 1a. When the pressure of the operating medium of the jack is released, the jack returns the inner tubular member 1a to its operative position under the action of air compressed in the jack during the depression of the inner tubular member 1a.

The filter also has an inlet 21 for compressed air controlled by a valve 22.

The pumps 14, 17 and 19 and the valve 22 are controlled by solenoids of a controller to be described with reference to FIG. 3.

In the present embodiment, a cycle of operation commences with the filter in an operative condition charged with slurry which has been compressed to a cake by the application of hydraulic fluid to the filter. The first step in the cycle is the operation of the pump 19 as a vacuum pump to drain the filter of hydraulic fluid via inlet 16. Secondly, the jack is operated to lower the inner tubular member 1a and the valve 22 is opened to discharge the filter cake by compressed air. A plurality, say two, blasts of compressed air are used and the jack is briefly released and re-pressurized between blasts to cause the inner tubular member 1a to effect a short upward and downward movement to assist in the discharge of the cake. At the completion of the blasts, the jack is released again and returns the inner tubular member to its operative position. Pump 14 is then operated to feed slurry to be pressure filtered via inlet 13 into the filter whilst hydraulic fluid is supplied at low pressure by pump 19 operated as a low-pressure supply pump until the compartment is completely filled. After this stage, hydraulic fluid is again supplied by pump 19 at a relatively low pressure to carry out a first reduction in the liquid content of the slurry, whereafter pump 17 is operated so that the pressure of the hydraulic fluid is increased considerably to complete the filtration. At the same time, the filtrate is extracted from the filter. When the filtration stage has finished, the supply of hydraulic fluid is shut off and the cycle is complete.

Figure 4:
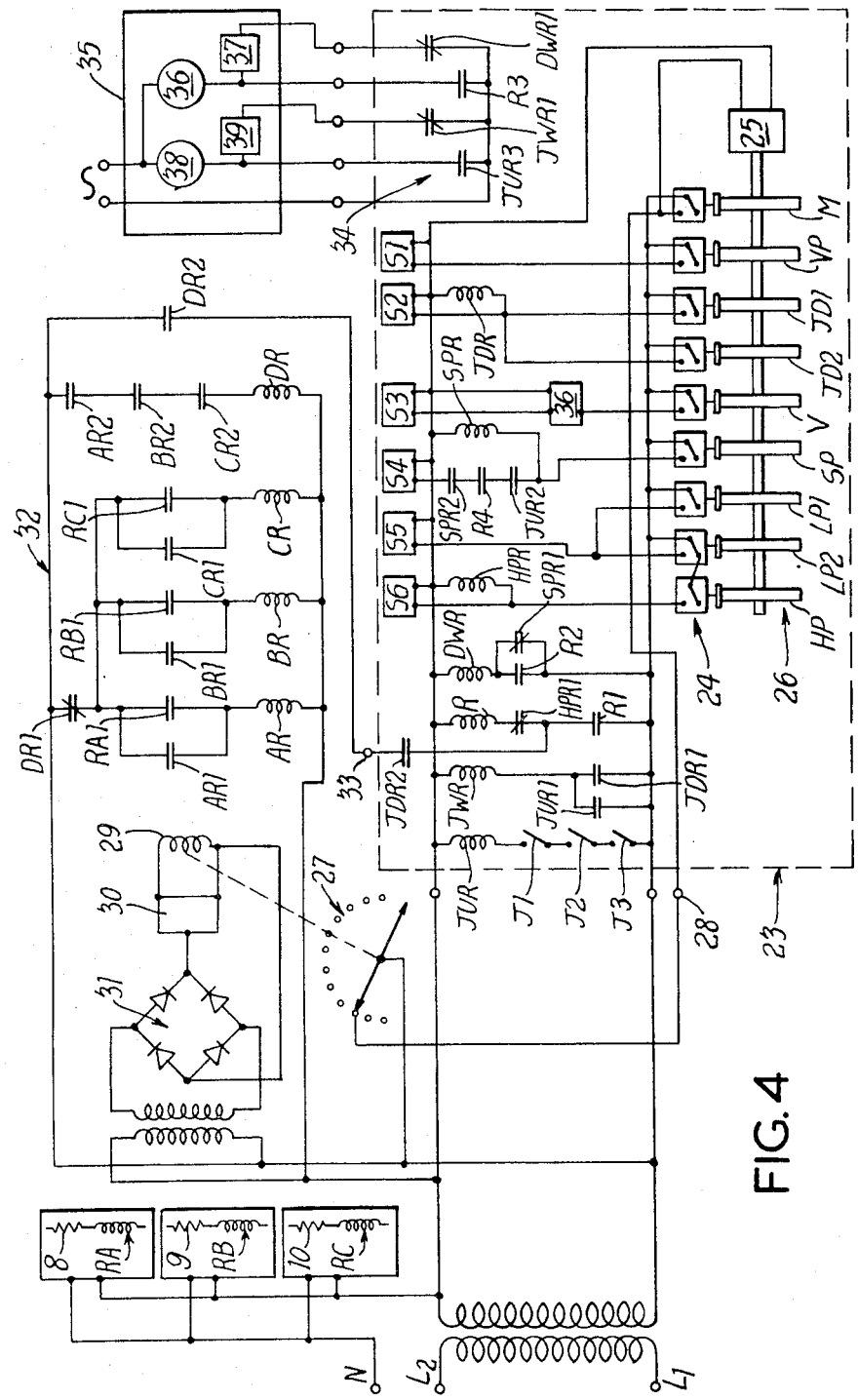
FIG. 4 is a circuit diagram of the control unit of FIG. 1.

FIG. 4 is a diagrammatic representation of the control unit 11 in association with the photoelectric cells 8, 9 and 10. The control unit contains a plurality of substantially identical controllers 23 for respective groups of tube pressure filters, but for simplicity only one of these controllers is shown. The illustrated controller will therefore simultaneously control one of the groups of filters shown in FIG. 1. Solenoids $S_1, S_2 \ldots S_6$ are provided for operating, respectively, the vacuum pump 19, the jack 20, the valve 22, the pump 14, the pump 19 in two low-pressure delivery modes and the pump 17 in a high-pressure delivery mode. These solenoids are connected across the two phases of a two-phase plus neutral power source $L_1$, $L_2$ and N by cam-controlled contacts 24 operated via cams 26 by a timer motor 25.

The controllers 23 are operated in a predetermined time sequence defined by a uniselector 27 the contacts of which are connected to the respective inputs 28 of the controllers. The uniselector coil 29 is fed with pulses by a pulse generator 30 energized a rectifier bridge 31 coupled to the power source phases $L_1$ and $L_2$.

The phases $L_1$ and $L_2$ also supply an array 32 of relay windings and contacts connected to an input 33 of each of the controllers 23.

The photodetector cells 8, 9 and 10 are associated with respective relays RA, RB and RC and are supplied from the neutral connection N and one of the phases of the power source. Contacts RA1, RB1 RC1 of the respective relays RA, RB and RC are included in the array 32.

Finally, the controllers include a relay contact array 34, connected to a warning or alarm circuit 35.

The operation of the control unit shown in FIG. 3 will now be described.

At the end of a cycle of operation of the group of filters controlled by the illustrated controller, the cam M of the cams 26 will have operated the associated contacts to ensure that the motor 25 has been energized for a time sufficient for it to reach a predetermined position for commencing the next cycle. At a subsequent time determined by the uniselector 27, the controller 23 will be energized at input 28 via the corresponding contact of the uniselector to commence a new cycle. The potential consequently applied to input 28 will energize the motor 25 which will move from its predetermined starting position and rotate the cams 26 at a predetermined speed to define the desired sequence of operating steps. Initially, cam VP will act on its associated contacts to energize solenoid $S_1$ to cause the vacuum pump 19 to extract hydraulic fluid from the three associated filters. During the final phase of hydraulic fluid extraction, cams JD1 and JD2 will successively act on their contacts to energize solenoid S2 twice in succession to cause the jacks 20 of the three filters to depress the associated inner tubular members 1a to their lowermost positions, to release those tubular members for a small upward movement, to depress the tubular members again and finally to release them so that they return to their operative positions. Limit switches J1, J2 and J3 close when the three jacks reach their uppermost positions to cause energization of a relay JUR which closes its relay contacts JUR1, JUR2 and JUR 3.

The contacts associated with cams JD1 and JD2 will also cause energization of a relay JDR which closes its contacts JDR1 and JDR2, JDR1 being a time delay contact which remains closed for a time sufficient for the jacks to return to their uppermost positions.

Closure of each of contacts JUR1 and JDR1 causes energization of a jack warning relay JWR having normally-closed contacts JWR1 connected to the warning or alarm circuit 35. As will be appreciated, contacts JWR1 should remain open from the beginning to the end of a cycle by virtue of the time delay of contacts JDR1.

Between the downward and upward movements of the jacks 20, air blasts are supplied by energizing solenoid $S_3$ an appropriate number of times determined by an interruptor 36 the operation of which is initiated by a cam V. By the end of the stage in the operating cycle, cake should have been discharged from each of the three filters, thereby interrupting the light incident on the three cells 8, 9 and 10 to energize the relays RA, RB and RC and close contacts RA1, RB1 and RC1 in the array 32. Closure of these contacts energizes relays AR, BR and CR, having holding contacts AR1, BR1 and CR1, via normally closed, time-delay, contacts DR1 of a relay DR in the array 32. The consequent closure of the contacts AR2, BR2 and CR2 of the relays AR, BR and CR energizes relay DR to open contacts DR1, after a predetermined delay, and close contacts DR2. Relay DR is therefore de-energized again so that contracts DR2 supply voltage to input 33 of controller 23 for a duration determined by the delay of contacts DR1. This voltage is sufficient to energize a relay R in the controller, which relay is held on by its own contacts R1. The relay R has further contacts R2, connected to energize a warning relay DWR, R3, connected to the warning circuit 35, and R4 connected to solenoid S4. However, the state of warning relay DWR is not changed as it is already energized through normally closed contacts SPR1 of relay SPR. Contacts DWR1 connected to warning circuit 35 can thus be regarded as normally open. At this stage, therefore, the contacts JUR3 and R3 connected to the warning circuit 35 are closed, indicating that, on the face of it, operation is proceeding correctly.

The cycle continues with the operation of the slurry pump 14 via cam SP, closed contacts JUR2 and R4, normally closed, delayed-opening contacts SPR2 of relay SPR and solenoid $S_4$. Continued operation of the cams produces the two low pressure hydraulic feeds by the action of cams LP1 and LP2 and solenoid $S_5$ and a high pressure feed by the action of cam HP and solenoid $S_6$. The cycle is concluded by the cam M returning the motor to its initial position for a new cycle, when the contacts associated with cam M open to de-energize the motor 25.

If, during a cycle, the cake from one of the filters is not discharged, one of relays RA, RB and RC is not energized. Consequently, the associated one of relays AR, BR and CR is not energized and relay DR is not energized, so that no signal appears at input 33 to energize relay R. Therefore, at this stage, contacts R1 to R4 remain open, whilst the operation continues even to the energization, by the action of cam SP, of the conductor extending to relay SPR. However, the slurry pump will not operate as contacts R4 are open. Operation of the relay SPR opens its contacts SPR1 to de-energize relay DWR (contacts R2 being open). Accordingly contacts DWR1 close. The warning circuit 35 now senses that, whilst the jacks have operated correctly, cake discharge is not complete and will give a warning or alarm signal.

The warning circuit 35 comprises two indicator lamps 36 and 38 with associated flasher units 37 and 39. With correct operation, contacts DWR1 and JWR1 are held open so that the flasher units are inoperative.

However, on the discharge of the cakes, contacts R3 close to energize the indicator lamp 36 and, when the jacks reach their uppermost positions, contacts JUR3 close to energize indicator lamp 38. If discharge of at least one of the cakes does not occur at the appropriate time, relay DWR is de-energized, contacts DWR1 close and the flasher unit 37 causes the lamp 36 to give warning flashes. Similarly, if any of the jacks do not operate correctly, relay JWR is deenergized, contacts JWR1 close and the flasher unit 39 causes lamp 38 to give warning flashes.

I claim:

1. In association with at least one tube pressure filter of the kind set forth, apparatus for determining whether filter cake has been discharged from said tube pressure filter, which apparatus comprises: a source of a beam of electromagnetic radiation disposed so as to direct said beam of electromagnetic radiation across the intended path of said filter cake when the latter is discharged from said tube pressure filter; a receiver device sensitive to said electromagnetic radiation disposed in the intended path of said beam of electromagnetic radiation downstream of said intended path of said filter cake; and means for sensing the occurrence, in an operating cycle of said filter, of both (a) the interception of said beam of electromagnetic radiation by discharging filter cake and (b) the relative displacement of said tubular bodies of said tube pressure filter to their position whereat particulate solid material can be discharged, whereby it can be determined whether filter cake has been discharged from said tube pressure filter.

2. Apparatus as claimed in claim 1 and comprising a plurality of said tube pressure filters disposed so that discharge of filter cake from any one of them intercepts said beam of electromagnetic radiation.

3. Apparatus as claimed in claim 2, and comprising means for causing said filters to operate in succession.

4. Apparatus as claimed in claim 3, wherein said means for causing said filters to operate in succession comprises a uniselector.

5. Apparatus as claimed in claim 3 and comprising a plurality of said sources with respective receivers each with an associated series of a plurality of said tube pressure filters and means for causing said filters to operate successively in groups each comprising a filter from each of said series.

6. Apparatus as claimed in claim 1, wherein said means for sensing the occurrence of the interception of said beam and the relative displacement of said tubular bodies comprises: a first relay coupled to said receiver and having contacts operated when the discharge of cake interrupts said beam; a second relay having contacts connected in series with said contacts of said first relay and operated when said tubular bodies are displaced relative to one another; and warning means coupled to said contacts connected in series.

7. Apparatus as claimed in claim 6, and comprising storage means for storing data representing the conductivity state of said series of contacts and an arrangement coupled to the warning means to render said warning means effective to read the data in said storage means at a time subsequent to jack operation and prior to slurry feed to said filter.

* * * * *